United States Patent [19]
Miwa et al.

[11] Patent Number: 5,415,173
[45] Date of Patent: May 16, 1995

[54] ULTRASOUND DIAGNOSIS SYSTEM

[75] Inventors: Yuichi Miwa, Ann Arbor, Mich.;
Kageyoshi Katakura, Tokyo, Japan;
Hideyuki Ban, Kodaira, Japan;
Hiroshi Masuzawa, Hachioji, Japan;
Hiroshi Kanda, Tokorozawa, Japan

[73] Assignee: Hitachi, Ltd., Tokyo, Japan

[21] Appl. No.: 197,766

[22] Filed: Feb. 16, 1994

[30] Foreign Application Priority Data

Feb. 23, 1993 [JP] Japan ................... 5-033019

[51] Int. Cl.$^6$ .............................. A61B 8/00
[52] U.S. Cl. .............................. 128/661.01
[58] Field of Search ............... 128/660.01, 660.02,
128/660.06, 660.07, 661.01, 660.04

[56] References Cited

U.S. PATENT DOCUMENTS

| | | | |
|---|---|---|---|
| 4,664,123 | 5/1987 | Iinuma | 128/660.07 |
| 4,779,623 | 10/1988 | Sumino et al. | 128/660.04 |
| 4,781,199 | 11/1988 | Hirama et al. | 128/660.01 |
| 4,974,558 | 12/1990 | Katakura et al. | 128/661.01 |

FOREIGN PATENT DOCUMENTS 59-212791  12/1984  Japan .................. 128/660.01

*Primary Examiner*—George Manuel
*Attorney, Agent, or Firm*—Antonelli, Terry, Stout & Kraus

[57] ABSTRACT

An ultrasound diagnosis system including a plurality of elements arrayed for transmitting ultrasonic wave to a testing object and for receiving ultrasonic wave reflected from the testing object, a device for giving a delay time distribution to respective transmitting and receiving signals of the elements to thereby form an ultrasonic beam having directivity in a predetermined direction, a device for displaying a sectional image of the testing object, and a sound velocity distribution control device for changing sound velocities in the testing object to be set up in respective elements in accordance with a focal point position of the ultrasonic beam and the respective positions of the elements in order to determine the delay time distribution, wherein the system further includes a sound velocity distribution control device for changing sound velocities to be set up in the respective elements on the basis of functions forming a system of orthogonal functions in which array number successively given to respective array positions of the elements in a transmitting and receiving aperture composed of a predetermined number of the elements is regarded as a variable, and on the basis of expanding coefficients by which respective functions forming the system of orthogonal functions are multiplied respectively.

19 Claims, 10 Drawing Sheets

ULTRASOUND DIAGNOSIS SYSTEM

BACKGROUND OF THE INVENTION

The present invention relates to an ultrasound diagnosis system adapted for medical diagnosis and particularly relates to an ultrasound diagnosis system in which sound velocity set up in respective elements of an ultrasonic probe can be changed in order to eliminate the influence of an inhomogeneous medium.

In the ultrasound diagnosis system, a delay time distribution is given to a plurality of signals received by a plurality of arrayed elements of a probe to form an ultrasonic beam having directivity in a predetermined direction to thereby obtain a sectional image of a testing object. However, because the testing object (human body) is generally an inhomogeneous medium, it is necessary that the delay time distribution is changed in accordance with the testing object in order to form a high-resolution ultrasonic beam. FIG. 2 shows an example of the wavefront of reflected ultrasound pulse in the case where the testing object is homogeneous and in the case where the testing object is inhomogeneous. Now, consideration is made only on the case of reception for the sake of simplification of explanation. When the sound velocity in a medium is known and the medium is homogeneous, the wavefront of ultrasound pulse reflected from a reflecting object 20 reaches elements 21 to 25 (E1 to E5) of a probe as an ideal wavefront 26. In this occasion, the pulse reaches the element 23 (E3) first and the pulse reaches the elements 21 (E1) and 25 (E5) last on the basis of the positional relations between the reflecting object 20 and the elements 21 to 25. Therefore, suitable delay times are given to the pulses received by the elements 22, 23 and 24 (E2, E3 and E4) respectively to adjust the phases of all the pulses. After the phases of all the pulses are adjusted in the aforementioned manner, these pulses are added up to amplify only receiving pulses obtained from a target direction to thereby form a high-resolution sectional image. In the case where the sound velocity in the testing object is known and the testing object is a homogeneous medium, the delay times to be given can be obtained analytically. When the respective distances between the reflecting object 20 and the elements 21 to 25 (E1 to E5), the values of sound velocity to be set up in the respective elements 21 to 25 (E1 to E5) (hereinafter simply referred to as "set-up of sound velocity") under the consideration of difference in propagating path of ultrasound wave and the delay times to be given to the respective receiving signals of the elements are represented by $L_i$ ($1 \leq i \leq 5$), $c_i$ ($1 \leq i \leq 5$) and $\tau_i$ ($1 \leq i \leq 5$) respectively and when the maximum in $L_i/c_i$ ($1 \leq i \leq 5$) is further represented by $(L/c)max$, the following expression (1) is obtained.

$$\tau_i = (L/c)max - (L_i/c_i) \quad (1)$$

When the distance between the reflecting object and the probe and the pitch of the elements are represented by R and d respectively, the following expressions (2) to (4) are obtained in the case of FIG. 2.

$$L1 = L5 = \sqrt{\{R^2 + (2d)^2\}} \quad (2)$$

$$L2 = L4 = \sqrt{\{R^2 + d^2\}} \quad (3)$$

$$L3 = R \quad (4)$$

In the case where the sound velocity in the testing object is known and the testing object is a homogeneous medium, the set-up of sound velocity $c_i$ is common to the elements 21 to 25 (E1 to E5) regardless of i. In practice, however, an inhomogeneous medium 28 is present between the reflecting object 20 and the elements 21 to 25, so that the wavefront of an ultrasound pulse is formed as an aberrated wavefront 27. Accordingly, it is necessary to correct the delay times to be given to the receiving signals of the respective elements. First, the ideal wavefront 26 can be made to approach the aberrated wavefront 27 by changing the set-up of sound velocity $c_i$ for all the elements regardless of i. However, this is rough correction. In order to obtain a high-resolution sectional image, it is necessary to correct under the consideration of the change of sound velocity from the point of view of averaging of velocity differences between the elements on the propagating path of ultrasound wave. As a conventional example posterior to the method of changing of a sound velocity in common with each element, JP-A-59-212791 discloses a method of changing sound velocities to be set up in the respective elements.

SUMMARY OF THE INVENTION

According to JP-A-59-212791, as a first stage, a sound velocity set up in common with all elements (which velocity has a value of sound velocity in common with each element and hereinafter referred to as "sound velocity set-up in common with each probe element") is determined so that the resolution of a sectional image is maximized. Then, the elements are classified into groups and sound velocities set up in the respective groups are determined so that the correlation between the sectional image obtained based on the aforementioned sound velocity set-up in common with each probe element and an individual sectional image obtained based on only elements belonging to each group is maximized. In the case where the sound velocity set-up is changed based on only elements belonging to a specific group, the number of elements contained in the group is however reduced so that the resolution of the sectional image deteriorates. As a result, it is impossible to judge whether the changing of the sound velocity set-up in the group is to be terminated or not to be terminated. Further, in the case where the number of elements contained in each group is small, the sectional image based on only elements contained in the group may be widely different from the sectional image based on the whole elements so that it becomes different to obtain the correlation. On the contrary, in the case where the number of elements contained in each group is large, the number of groups is reduced so that the number of sound velocities allowed to be changed individually is reduced. As a result, accuracy in correction of sound velocities to be set up is lowered.

An object of the present invention is to provide an ultrasound diagnosis system in which sound velocities to be set up in all probe elements in an aperture for transmitting and receiving can be always changed while the influence of the change of the sound velocity set-up on the sectional image is confirmed easily and in which the sound velocities to be set up in the respective elements are always converged to optimum values.

According to an aspect of the present invention, there is provided an ultrasound diagnosis system comprising a plurality of elements arrayed for transmitting ultrasonic wave to a testing object and for receiving ultrasonic wave reflected from the testing object, a unit for giving a delay time distribution to respective transmitting and receiving signals of the elements to thereby form an ultrasonic beam having directivity in a predetermined direction, and a sound velocity distribution control unit for changing sound velocities to be set up in the respective elements in the testing object in accordance with the focal point position of the ultrasonic beam and the respective positions of the elements in order to determine the delay time distribution, wherein the system further comprises sound velocity distribution control unit for changing sound velocities to be set up in the respective elements on the basis of functions forming a system of orthogonal functions in which array number successively given to respective array positions of the elements in a transmitting and receiving aperture composed of a predetermined number of the elements is regarded as a variable, and on the basis of expanding coefficients by which respective functions forming the system of orthogonal functions are multiplied respectively. For example, trigonometric functions are used as the functions forming a system of orthogonal functions.

According to another aspect of the present invention, the system further comprises a unit for setting the delay time distribution determined on the basis of the sound velocity distribution set up by the sound velocity distribution control unit, as initiating time distribution of transmitting pulse sound for driving the respective elements in the aperture.

According to a further aspect of the present invention, the system further comprises a resolution evaluator for evaluating resolution of the sectional image, so that the expanding coefficients are determined to make the output of the resolution evaluator approach a predetermined set value.

According to a further aspect of the present invention, the resolution evaluator calculates the sum of the respective squares of amplitude of receiving signal beamformer outputs.

According to a further aspect of the present invention, the system further comprises analog-to-digital conversion unit for subjecting the respective receiving signals of the elements in the aperture to analog-digital conversion, and storage unit for storing the output signal of the analog-to-digital conversion unit, so that a sectional image is obtained by using data stored in the storage unit.

According to a further aspect of the present invention, a sectional image is real-time obtained by using the respective receiving signals of the elements in the aperture and, at the same time, the output signal of the analog-to-digital conversion unit is stored in the storage unit so that the change of the sound velocity distribution set up in the respective elements is performed by using data stored in the storage unit when the sectional image is obtained.

According to a further aspect of the present invention, the system further comprises sound velocity distribution display unit for displaying sound velocities to be set up in the respective elements so that the sound velocity distribution set-up is displayed on a 2-dimensional coordinate plane constituted by first coordinates for displaying sound velocities to be set up in the respective elements, and second coordinates for displaying the array number.

In the present invention, sound velocity values to be set up in the respective elements are changed by changing coefficients for the respective functions in a system of orthogonal functions as obtained by expanding of the sound velocity set-up for the respective elements in the aperture for transmitting and receiving on the basis the functions forming a system of orthogonal functions. Accordingly, not only the influence of the changing of the sound velocity set-up on the sectional image can be confirmed easily but the sound velocities to be set up in the respective elements are always converged to optimum values.

DESCRIPTION OF THE PREFERRED EMBODIMENTS

Embodiments of the present invention will be described below with reference to the drawings.

Embodiment 1

Figure 1:
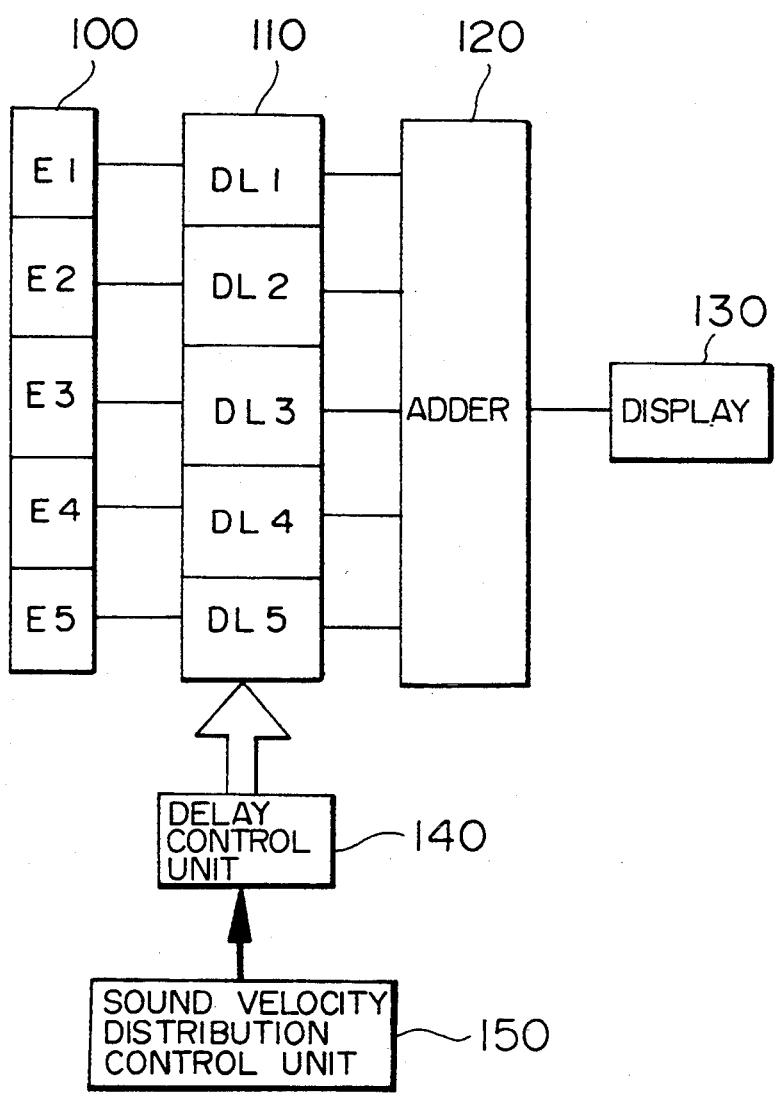
FIG. 1 is a diagram showing the configuration of an ultrasound diagnosis system as an embodiment of the present invention.
Figure 2:
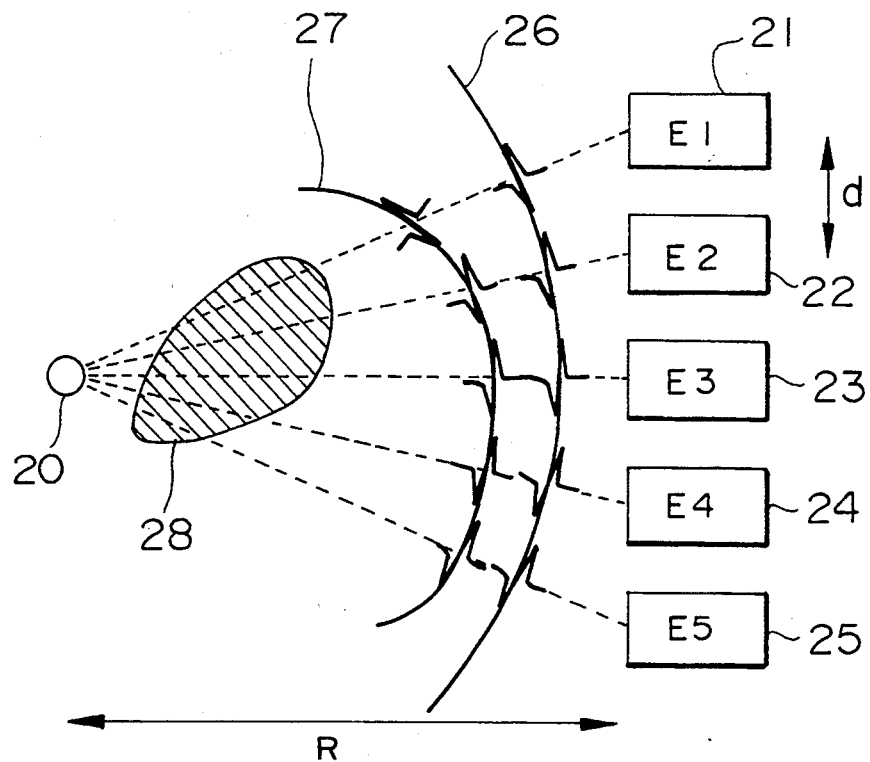
FIG. 2 is a diagram showing the wavefront of reflected ultrasound pulses in the case of a homogeneous testing object and in the case of an inhomogeneous testing object.

Referring to FIG. 1, there is shown the configuration of an ultrasound diagnosis system as an embodiment of the present invention. In this embodiment, resolution of a sectional image is evaluated by a person who operates the system. As shown in FIG. 1, the ultrasound diagnosis system comprises elements 100 (E1 to E5) of a probe, delay units 110 (DL1 to DL5), an adder 120, a display 130, a control unit 140 for delay, and a control unit 150 for sound velocity distribution. Other parts such as an amplifier, a detector, and so on, included in the ultrasound diagnosis system in practical use are not shown in FIG. 1 for the sake of simplification of explanation. Signals received by the elements 100 are delayed suitably in the delay units 110 respectively. The delayed signals are added up in the adder 120 so that only signals reflected from a target direction intensify each other. After addition, the resulting signal is subjected to image processing and then displayed on the display 130 to form a sectional image. The delay times to be given by the delay units 110 are controlled by the delay control unit 140. In the configuration of FIG. 1, the system first sets up an initial value of sound velocity for each element so as to be in common with each element and operates the delay control unit 140 to give an initial distribution of delay time to the delay units 110 in accordance with the initial set-up of sound velocity to thereby form a sectional image. Generally, the initial value assumed as sound velocity in a testing object is about 1500 m/s. Because the testing object is however not such a homogeneous medium in which sound velocity is known, the sound velocity set up in common with each element is changed by the following procedure.

Figure 3:
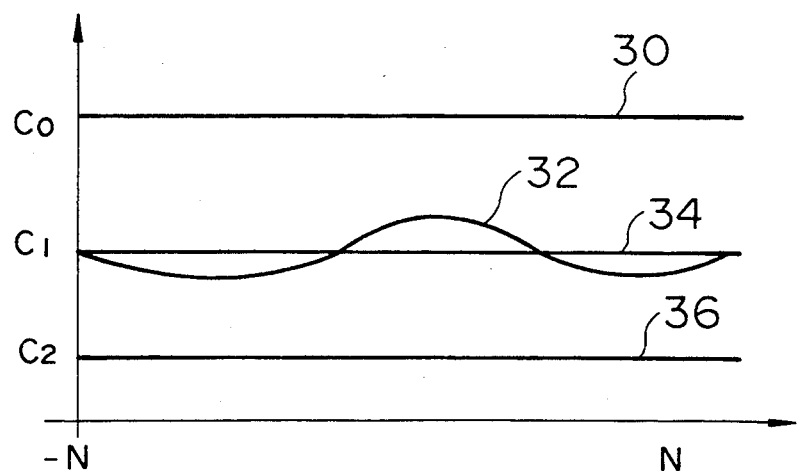
FIG. 3 is a diagram showing a change of sound velocity distribution set up in respective elements.

Referring to FIG. 3, a procedure for changing the sound velocity set up in common with each element will be described. In this embodiment, a group of functions for forming a system of orthogonal functions are first set up in order to change the initial set-up 30 of sound velocity distribution into optimized set-up 32 of sound velocity distribution for providing a good-resolution sectional image. Hereinafter, the case where trigonometric functions are used as the functions for forming a system of orthogonal functions will be described as an example. When the total number of elements of a probe and element number are represented by 2N and p ($-N \leq p < N$) respectively, the following expression (5) forms an orthogonal system in the condition of $$-N \leq p < N$$

$$\{1, \cos(n\pi p/N), \sin(n\pi p/N)\}, (n=1, 2 \quad\quad (5)$$

When functions for determining set-up of sound velocity in respective elements are represented by $v(p)$, arbitrary $v(p)$ in the range of $-N \leq p < N$ can be developed by the group of functions represented by the expression (5). Further, because the elements are present discretely, components having angular frequencies higher than $\pi$ can be neglected in accordance with the theorem of sampling. Accordingly, when the following expression (6) is established as a partial group of the expression (5), arbitrary $v(p)$ in the range of $-N \leq p < N$ can be developed by the group of functions represented by the expression (6).

$$\{1, \cos(n\pi p/N), \sin(n\pi p/N)\}, (n=1, 2, \ldots, N) \quad\quad (6)$$

The expression (6) is rewritten as follows.

$$\{f_q(p)\}, (q=0, 1, 2, 3, \ldots, 2N)$$

$$f_q(p)=1, (q=0)$$

$$f_q(p)=\cos(q\pi p/N), (1 \leq q \leq N)$$

$$f_q(p)=\sin((q-N)\pi p/N), (N+1 \leq q \leq 2N) \quad\quad (7)$$

In this embodiment, constants $A_q$ ($0 \leq q \leq 2N$) by which respective functions $f_q(p)$ in the expression (7) will be multiplied are inputted through the sound velocity distribution control unit 150 shown in FIG. 1 before $v(p)$ is obtained in accordance with the following expression (8).

$$v(p) = \sum_{q=0}^{2N} A_q f_q(p) \quad\quad (8)$$

In accordance with the set-up of sound velocity distribution obtained in accordance with the expression (8), the delay units 110 give a distribution of delay time to the delay control unit 140. Because in this occasion $A_0 f_0(p)$ is a constant, this value can be considered as an offset value of sound velocity set up in respective elements. Accordingly, $A_q f_q(p)$ ($1 \leq q \leq 2N$) can be considered as change values from the offset value of sound velocity set up in respective elements. Because the sound velocity distribution of the human body has a range of about $\pm 100$ m/s with about 1500 m/s as its center value, $A_0$ is one digit larger than $A_q$ ($1 \leq q \leq 2N$). Accordingly, it is preferable that an input unit for $A_0$ and an input unit for $A_q$ ($1 \leq q \leq 2N$) are provided separately. The initial set-up 30 of sound velocity distribution is represented by $A_0=c_0$, $A_q=0$ ($1 \leq q \leq 2N$) in the expression (8). First, only $A_0$ which is an offset value is changed to make the initial set-up 30 of sound velocity distribution approach optimized set-up 32 of sound velocity distribution for providing a high-resolution sectional image.

Referring to FIG. 3, there is shown the change of sound velocity distribution set up in respective elements. As shown in FIG. 3, if optimized set-up 34 of sound velocity distribution in the condition of $A_0=c_1$ obtained by changing a sound velocity in common with each element is nearest to the set-up 32 of sound velocity distribution for providing a high-resolution sectional image, the value of $A_0$ is too large with this value of $c_0$. The term "nearest" herein used unit that the sum of the respective squares of the differences between the set-up 32 of sound velocity distribution and the set-up 34 of sound velocity distribution takes a minimum. When $A_0$ is reduced from $c_0$, the initial set-up 30 of sound velocity distribution approaches the optimized set-up 34 of sound velocity distribution obtained by changing a sound velocity in common with each element so that the resulting sectional image approaches an optimized image with good resolution. When $A_0$ is reduced to $c_1$ and further to $c_2$, the optimized set-up 34 of sound velocity distribution obtained by changing a sound velocity in common with each element approaches set-up 36 of sound velocity distribution obtained by changing a sound velocity in common with each element so that resolution becomes poor again gradually. The human operator terminates the change of $A_0$ at the point of time when a judgment is made that resolution which has become good gradually begins to become poor again. At the point of time of termination, a sound velocity $c_1$ is given to all elements. That is, the change of $A_0$ is equivalent to the conventional change of a common sound velocity. Then, $A_q$ ($1 \leq q \leq 2N$) are inputted sequentially so that the optimized set-up 34 of sound velocity distribution obtained by changing a sound velocity in common with each other approaches the set-up 32 of sound velocity distribution for providing a good-resolution sectional image. Like the case of inputting of $A_0$, also in this case, the operator terminates the change of each $A_q$ at the point of time when a judgment is made that the resulting sectional image is optimum. Whenever each $A_q$ ($1 \leq q \leq 2N$) is inputted, v(p) changes in accordance with the expression (8) so that the delay control unit 140 gives a delay time distribution to the delay units 110 in accordance with the sound velocity set-up of each element determined by v(p). Because in the aforementioned method sound velocities of all elements change when one value $A_q$ is inputted, the influence of the change of set-up of sound velocity on the resulting sectional image can be confirmed easily.

The following expression (9) is obtained by Fourier expansion of the set-up 32 of sound velocity distribution for providing a good-resolution sectional image.

$$\sum_{k=0}^{2N} F_k f_k(p) \tag{9}$$

In the expression (9), $f_k(P)$ ($0 \leq k \leq 2N$) is the same as $f_q(p)$ in the expression (7), and $F_k$ is a Fourier coefficient. An arbitrary value $A_m$ ($0 \leq m \leq 2N$) is inputted through the sound velocity distribution control unit 150 to obtain a value of $A_m$ in which the sum of the respective squares of the differences between the expressions (9) and (8) in the condition of $-N \leq p < N$ is minimized. The sum of the respective squares of the differences between the expressions (9) and (8) is represented by the following expression (10).

$$\int_{-N}^{N} \left\{ \sum_{k=0}^{2N} F_k f_k(p) - A_m f_m(p) \right\}^2 dp \tag{10}$$

The expression (10) is calculated as follows.

$$\int_{-N}^{N} \left\{ \sum_{k=0}^{2N} F_k f_k(p) \right\}^2 dp + A_m^2 \int_{-N}^{N} \{f_m(p)\}^2 dp - 2A_m \int_{-N}^{N} \sum_{k=0}^{2N} F_k f_k(p), f_m(p) dp \tag{11}$$

Because $f_k(P)$ forms an orthogonal system in the range of $-N \leq p < N$, the third term in the expression (11) is integrated to zero in the condition of $k \neq m$. Accordingly, when the first term in the expression (11) which term is a constant and the value of integration of $\{f_m(p)\}^2$ in the range of $<N \leq p < N$ are represented by X and Y respectively, the expression (11) is rewritten to the following expression (12) so that the value of the expression (12) is always minimized in the condition of $A_m = F_m$.

$$X + A_m^2 Y - 2A_m F_m Y = Y(A_m - F_m)^2 - YF_m^2 + X \tag{12}$$

That is, when the Fourier coefficient in the Fourier expansion of the set-up 32 of sound velocity distribution for providing a good-resolution sectional image is coincident with $A_m$, the sum of the respective squares of the differences of the expressions (9) and (8) is minimized. In other words, if coefficients $A_m$ in respective functions $f_m(p)$ are set by mistake at the time of the Fourier expansion of the set-up 32 of sound velocity distribution for providing a good-resolution sectional image, delay time error occurs so that the resolution of the resulting sectional image necessarily becomes poor. Further, even in the case where $A_m$ ($0 \leq m \leq 2N$) are set in any order, the expression (8) becomes coincident with Fourier series of the set-up 32 of sound velocity distribution for providing a good-resolution sectional image at the point of time when inputting of all values of $A_m$ is finished so that the resolution of the resulting sectional image isoptimized. This is a large advantage in use of orthogonal functions. Although the expression (7) has shown the case where functions forming an orthogonal system are constituent elements of the group, it is a matter of course that the present invention is not limited thereto and that the present invention can be applied to the case where functions approximate to functions forming an orthogonal system are part or whole of constituent elements of the group. In this case, arbitrary v(p) cannot be developed by the given group of functions but there is no matter as long as the difference between v(p) obtained in accordance with the expression (8) and the set-up 32 of sound velocity distribution for providing a high-resolution sectional image can be neglected. In this case, the aforementioned difference decreases as the correlation coefficient between element functions in the function group including the aforementioned approximate functions as constituent elements decreases. The "correlation coefficient" herein used unit a value obtained by integrating the third term in the expression (11) in the condition of $k \neq m$.

Embodiment 2

A method in which a system evaluates resolution automatically to improve resolution without the operator's judgment as to whether resolution of the resulting sectional image is optimum or not, will be described next. For example, there is defined an image resolution evaluation function for judging the state of resolution of the resulting sectional image, which function is determined on the basis of feature quantities extracted from the sectional image. The value of the image resolution evaluation function in the case where resolution of the sectional image is best is calculated in advance so that the set-up of sound velocity is changed with use of this value as a target set value for focusing to bring the value of the image resolution evaluation function as near the target set value as possible in a region of interest of the sectional image. Using the fact that the phases of signals received by respective elements are arranged regularly to maximize the energy of the output signal of the adder 120 when delay times given to the respective elements are optimum, the image resolution evaluation function can be determined on the basis of total energy in the region of interest as one of the aforementioned feature quantities. The "total energy" herein used unit the sum of the respective squares of amplitude of signals in the designated region. Accordingly, the image resolution evaluation function takes a maximum value when the resolution of the sectional image is best. This is based on the theory that intensification due to interference between signals received from a refection source is maximized at the point of time when most appropriate delay time adjustment is achieved. The designated region must have not only one point on the image in the vicinity of the focal point but a finite area in an azimuthal direction. That is, the delay time distribution obtained on the basis of the evaluation function must have the same correcting effect even in the case where it is used as a correction value in the focal point in extreme proximity thereto. This is necessary as a condition for avoiding the progression of optimization while an ultrasonic beam is deflected to the position of a reflection source except the focal point by correction. For the aforementioned reason, evaluation must be performed so that equal improvement of resolution effected by delay time correction is confirmed in an appropriate range over the azimuthal direction and ranging direction with the focal point to be subjected to correction as its center.

Figure 4:
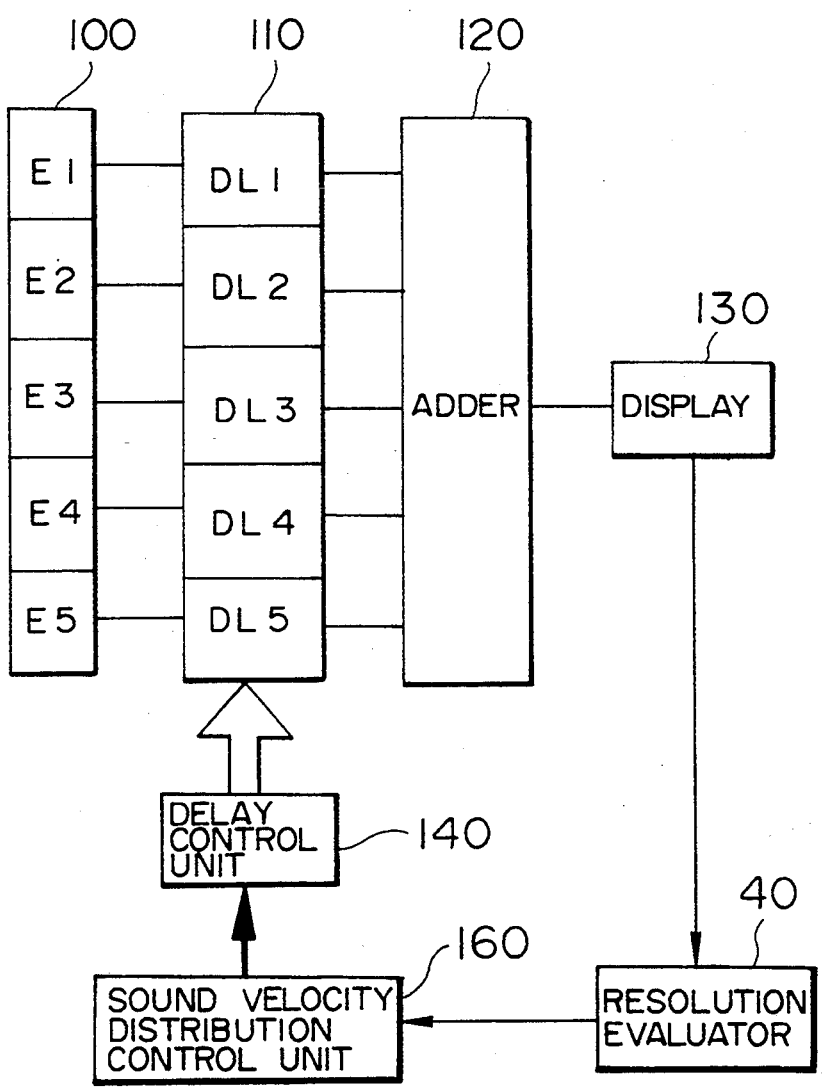
FIG. 4 is a diagram showing the configuration of an example of the ultrasound diagnosis system in which resolution evaluation is performed automatically.

Referring to FIG. 4, there is shown the configuration of an ultrasound diagnosis system as an embodiment of the present invention in which resolution is evaluated automatically. The control unit 160 for sound velocity distribution calculates optimum sound velocities for respective elements automatically while changing respective $A_q$ ($0 \leq q \leq 2N$) to increase the output of the resolution evaluator 40 which calculates the sum of the respective squares of amplitude of signals in a designated region of a sectional image. Examples of arithmetic operation for evaluation of resolution in the resolution evaluator 40 includes (a) energy arithmetic operation for calculating total energy in the designated region, (b) intensity arithmetic operation for calculating a slope of from the point of maximum intensity to a point where intensity is reduced by 6 dB, and (c) spatial frequency arithmetic operation for calculating dispersion of spectrum of spatial frequency. As a signal to be subjected to such arithmetic operation, the output signal of the adder 120 may be used directly or a signal obtained by subjecting the output signal to a detecting process may be used. Resolution may be evaluated by only one arithmetic operation or may be evaluated on the basis of a total result of a plurality of arithmetic operations, for example, the aforementioned operations (a), (b) and (c). When the set-up of sound velocity distribution for each element is determined, delay time to be given to the signal received by each element is calculated in accordance with the expression (1). If in this occasion such delay time is set up not only for the receiving signal but for the timing of initiating of transmitting pulse sound, resolution of the resulting sectional image can be improved more greatly.

Embodiment 3

Figure 5:
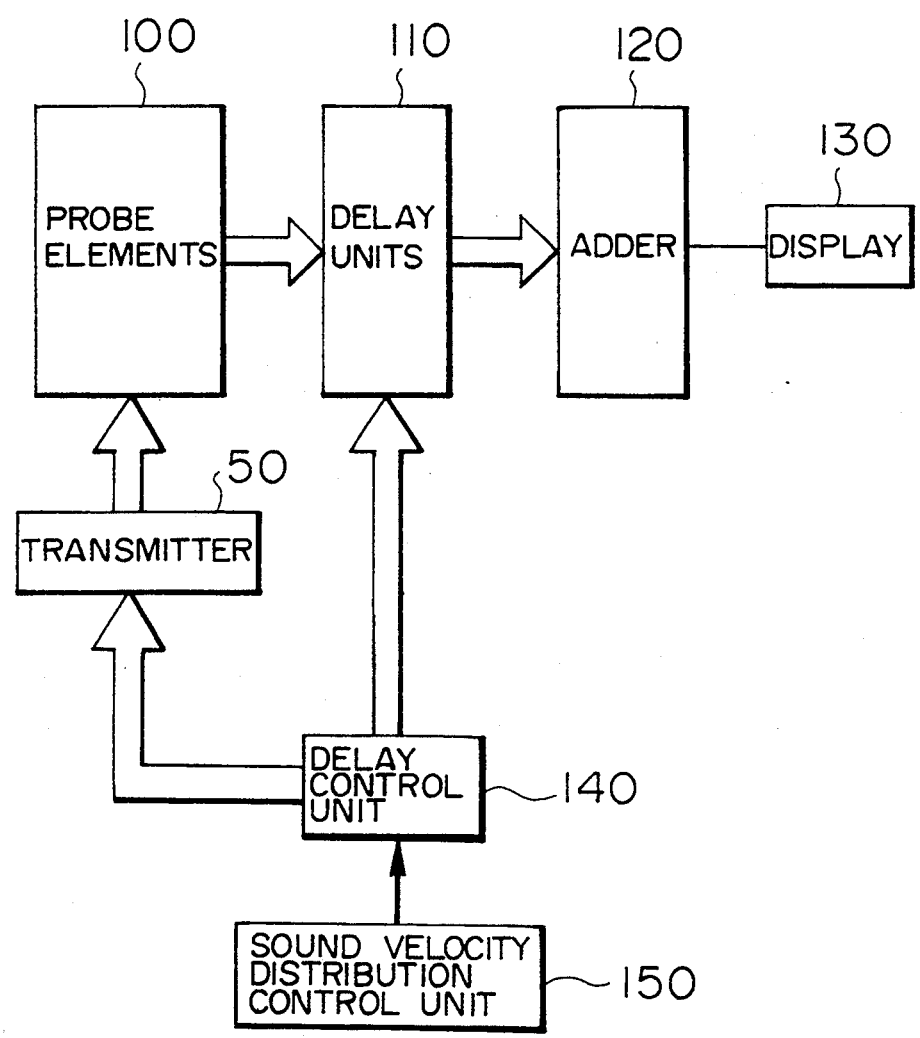
FIG. 5 is a diagram showing the configuration of an example of the ultrasound diagnosis system in which optimized delay time is fed back to the initiating time distribution of transmitting sound.

Referring to FIG. 5, there is shown the configuration of an ultrasound diagnosis system as another embodiment of the present invention in which optimum delay time is fed back to the initiating time distribution of transmitting pulse sound. The transmitter 50 drives the elements 100 of the probe in the initiating time distribution equal to the delay time distribution in the delay units 110. When the set-up of sound velocity distribution is changed in the sound velocity distribution control unit 150 to improve resolution of the resulting sectional image, the delay time distribution obtained in accordance with the expression (1) is given from the delay control unit 140 to the delay units 110 and at the same time transmitting pulses are given from the transmitter 50 to the respective elements in the initiating time distribution equal to the delay time distribution obtained in accordance with the expression (1). Further, the resolution evaluator 40 shown in FIG. 4 may be added to the configuration shown in FIG. 5 so that focusing can be performed automatically by using the sound velocity distribution control unit 160.

Embodiment 4

Figure 6:
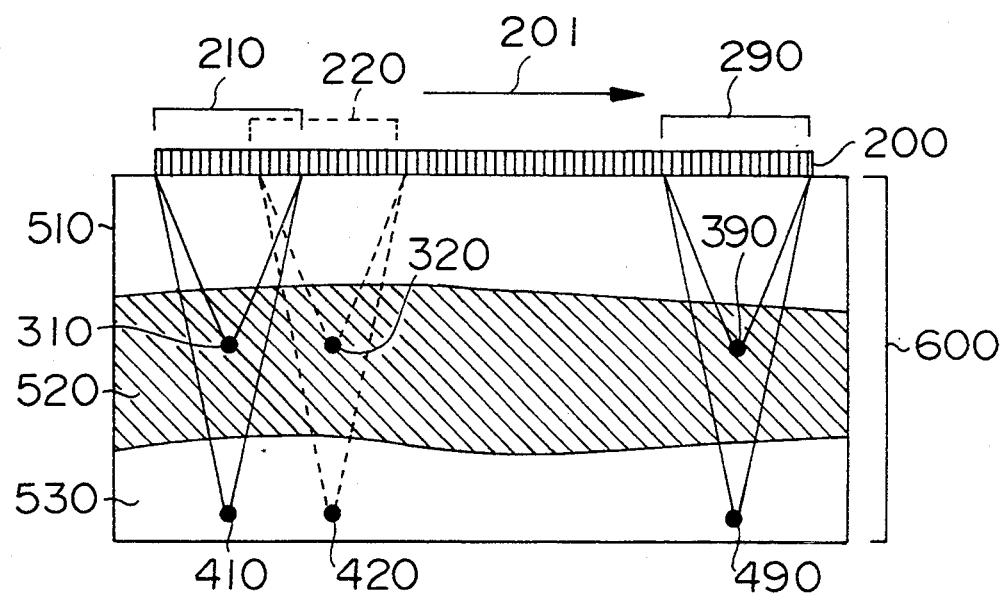
FIG. 6 is a sectional view showing the relationship between layered distribution of sound velocity and set-up of focal point in a testing object in the case of linear array scanning.
Figure 7:
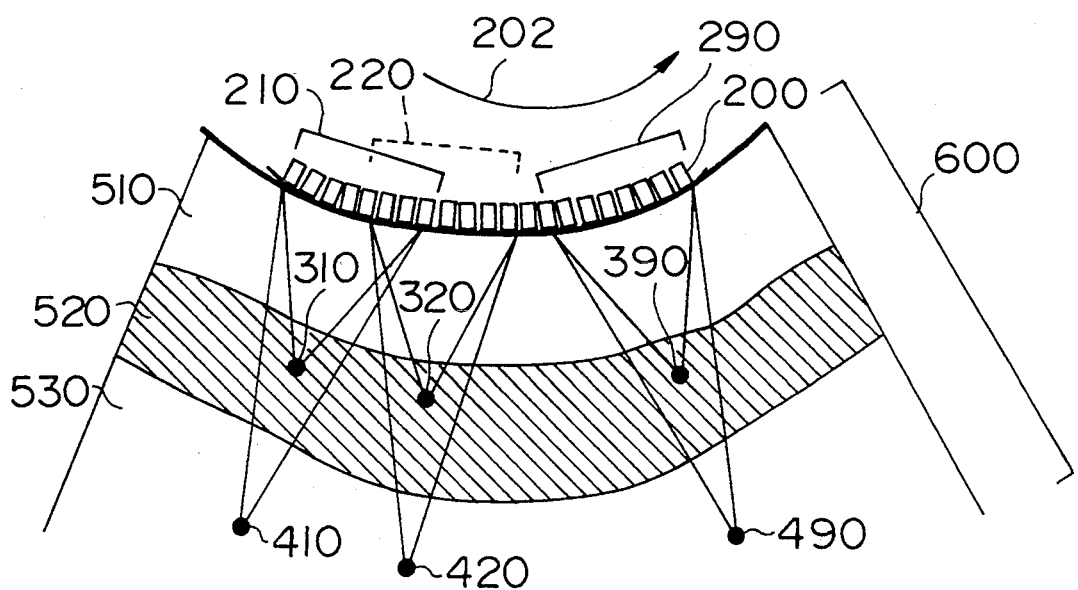
FIG. 7 is a sectional view showing the relationship between layered distribution of sound velocity and set-up of focal point in a testing object in the case of curved linear array scanning.

An embodiment in which sound velocity correction according to the present invention is applied to electronic scanning will be described below. Referring to FIGS. 6 and 7, a method of setting the focal point and setting up sound velocities for respective elements of a probe will be described in the case where a layered distribution of sound velocity is present in a testing object at the time of linear array and curved linear array scanning. FIG. 6 shows the position of the focal point in a sectional plane 600 of a testing object in the case where linear array scanning is performed in a scanning direction 201 of the arrow by using a probe having a linear element array 200. Like the conventional linear electronic scanning, in this embodiment, a sectional image is obtained by scanning while successively moving the aperture position 210, 220 to 290 for transmitting and receiving, of the element array 200 and successively moving the focal point position 310, 320 to 390, 410, 420 to 490 for transmitting and receiving. In the human body which is a testing object, layered tissues different in sound velocity as shown in regions 510, 520 and 530 in FIGS. 6 and 7 are generally present in the order of skin, fat, muscle and body of organ from the body surface side in proximity to the element array 200 of the probe. In these regions, the change of sound velocity in the element array direction is relatively small, so that correction values to be given to delay times of respective elements in order to correct irregularity of sound velocity in the testing object with respect to elements in the aperture become very near values even in the case where the aperture position for transmitting and receiving moves. In the aperture position 210, there is a large different between the delay time correction value in the position 310 of a shallow focal point and the delay time correction value in the position 410 of a deep focal point. However, the delay time correction value distribution corresponding to the focal points 320 and 420 in the proximate aperture position 220 which points are equal in focal length to the focal points 310 and 410 respectively takes vary near values to the correction values corresponding to the focal lengths 310 and 410 respectively. On the basis of this feature, the optimum delay time correction value distribution obtained in the aperture position 210 in accordance with the respective focal lengths in advance can be used as initial values for the delay time correction value optimizing procedure in the adjacent aperture position 220. At the time of optimization of respective expanding coefficients in a system of orthogonal functions, it is necessary to determine optimum values by changing the respective expanding coefficients widely in the initial aperture position (210 in this embodiment) for initiating correction. On the other hand, in the adjacent aperture position, optimum points can be obtained easily by searching the vicinities of the expanding coefficients obtained in the prior aperture position. Further, in the case of correction on the assumption that the sound velocity distribution in the testing object is substantially parallel to the element array direction, the sound velocity correction value distribution is common with each aperture position so that functions to be obtained depend on the focal length.

Further, the sound velocity correction value distribution is symmetric in left and right in the aperture, so that the necessary number of expanding coefficients to be determined in the system of orthogonal functions is reduced to half. In the case where Fourier expansion is used for expansion of orthogonal functions, correction can be performed as long as coefficients in cosine function terms are determined. In this manner, the time required for optimization of correction can be reduced greatly by adjusting the feature of the scanning method to the feature of the structure of a live body without determining the correction value distribution in one-to-one correspondence with focal points which are set in a wide range in a sectional image. The above description can be also applied to the case where the element array 200 is of a curved linear array scanning type as shown in FIG. 7. Also in the curved linear array scanning (in which the scanning direction is represented by the arrow 202 shown in FIG. 7) in which a testing object is pressed from its surface layer by a convex probe so as to be in close contact with the probe, the layered structure (regions 510, 520 and 530 constituted by tissues different in sound velocity as shown in FIG. 7) is transformed analogously along the curved surface of the element array 200 of the probe so that the correction value distribution to be obtained mainly depends on the focal length.

Further, the aforementioned method can be also applied to a sector type scanning method. The correction value distribution optimized in a transmitting and receiving direction (raster) and dependent on the length in the transmitting and receiving direction is very similar to the correction value distribution in the adjacent, next transmitting and receiving direction. For this reason, expanding coefficients in a system of orthogonal functions optimized in the prior transmitting and receiving direction can be used as initial values for optimization. However, because correction values are not always symmetric in left and right in the element array even in the case where the sound velocity distribution in the testing object is in a perfectly parallel layered state, the number of expanding coefficients to be optimized is not reduced to half. However, because a region for sector scanning is generally symmetric in left and right, a common correction value distribution or common initial values can be used for optimization in two transmitting and receiving directions (raster) symmetric with respect to a perpendicular of the probe surface. As a result, the time required for optimization of setting-up of sound velocity can be reduced.

Embodiment 5

Further, the present invention can be applied to a process in which all receiving signals with respect to respective elements for providing a plurality of sectional images are stored in a storage unit in advance so that image resolution is improved by off-line processing without real-time improvement.

Figure 8:
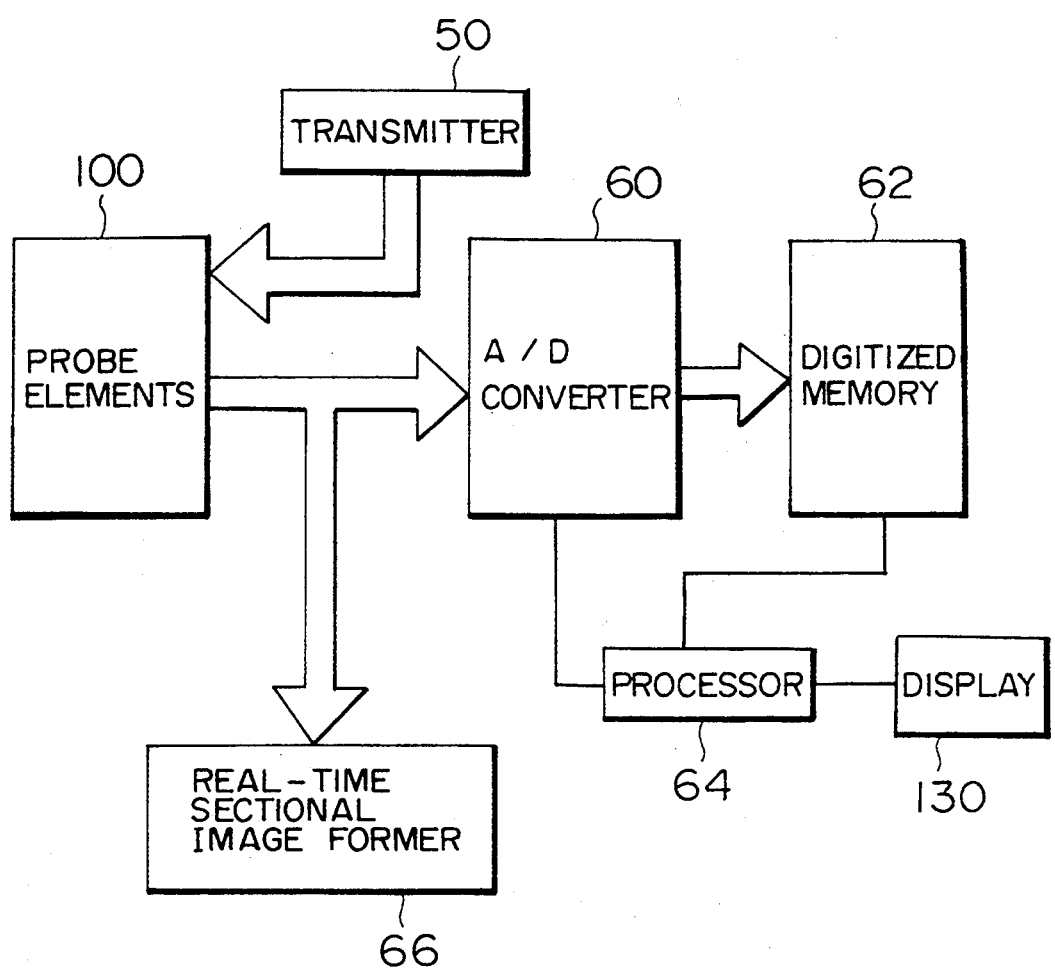
FIG. 8 is a diagram showing the configuration of an example of the ultrasound diagnosis system in which optimized set-up of sound velocity is obtained by off-line processing.

Referring to FIG. 8, there is shown the configuration of an ultrasonic diagnosis system as an embodiment of the present invention in which optimized set-up of sound velocity distribution is obtained by off-line processing. As shown in FIG. 8, the ultrasound diagnosis system comprises an analog-to-digital converter 60, a digitized memory 62, and a processor 64, and further comprises a real-time sectional image former 66 for real-time forming a sectional image, the former 66 being provided separately from the elements 100 of the probe and the transmitter 50 in the ultrasound diagnosis system. First, receiving signals from the elements 100 are fed to the real-time sectional image former 66, in which a conventional sectional image without correction due to sound velocity distribution is formed. At the same time, the receiving signals from the elements 100 are fed to the analog-to-digital converter 60 so that the analog-to-digital converter 60 stores all the receiving signals of the respective elements in the digitized memory 62 on the basis of the time distribution of initiating acquisition designated by the processor 64. In this occasion, the number of images allowed to be stored in the memory is determined in accordance with the capacity of the memory. In the case where a number M of sectional images are to be acquired, the number M of images can be acquired continuously or at intervals of several images in accordance with the time distribution of initiating acquisition in the processor 64. The processor 64 carries out signal processing such as phase matching, addition, detection, etc. on data stored in the digitized memory 62, forms sectional images and exhibits the sectional images on the display 130. In this case, sectional image data may be stored in the digitized memory 62 or may be stored in an image memory provided separately. In this embodiment, the processor 64 fulfills also the functions of the resolution evaluator 40, sound velocity distribution control unit 160 and delay control unit 140 which have been described already. That is, there is performed a process of: changing a sound velocity set up in each element by expansion of orthogonal functions while judging resolution of a sectional image; and obtaining delay time to be given to receiving signals on the basis of the set-up of sound velocity distribution to thereby make the resulting sectional image approach an optimized-resolution sectional image. In this occasion, the judgment of resolution may be made by a human operator and the operator's judgment may be inputted into the processor 64 through an input unit not shown. Alternatively, the judgment may be made by the processor 64 automatically in accordance with a result of resolution evaluation. Because all receiving signals of the respective elements are stored in the memory, even in the case where the processor 64 requires a long processing time for various kinds of signal processing, for example, the processor 64 can work all night to change the set-up of sound velocity distribution so that a focused sectional image in the memory 62 can be displayed and observed next morning. In the aforementioned off-line processing using memory, in the case where optimized delay time is also to be fed back to the initiating time distribution of transmitting sound, signals each obtained by transmitting sound from one element and receiving sound in one element are stored in the memory with respect to all combinations of elements. That is, in the case where the number of elements is N, $N^2$ receiving signals with respect to ultrasound transmitting and receiving in one place are stored in the memory. Further, in the case where an ultrasound sectional image is to be obtained by successively scanning transmitting and receiving aperture positions on the probe, all transmitting and receiving signals with respect to the respective elements can be stored in the memory unit before optimum delay time can be calculated through setting a sound velocity distribution to the respective elements by changing sound velocities set up in the respective elements in the transmitting and receiving aperture in respective scanning positions so that a sectional image excellent on the whole of the scanning region can be obtained.

Embodiment 6

Figure 9:
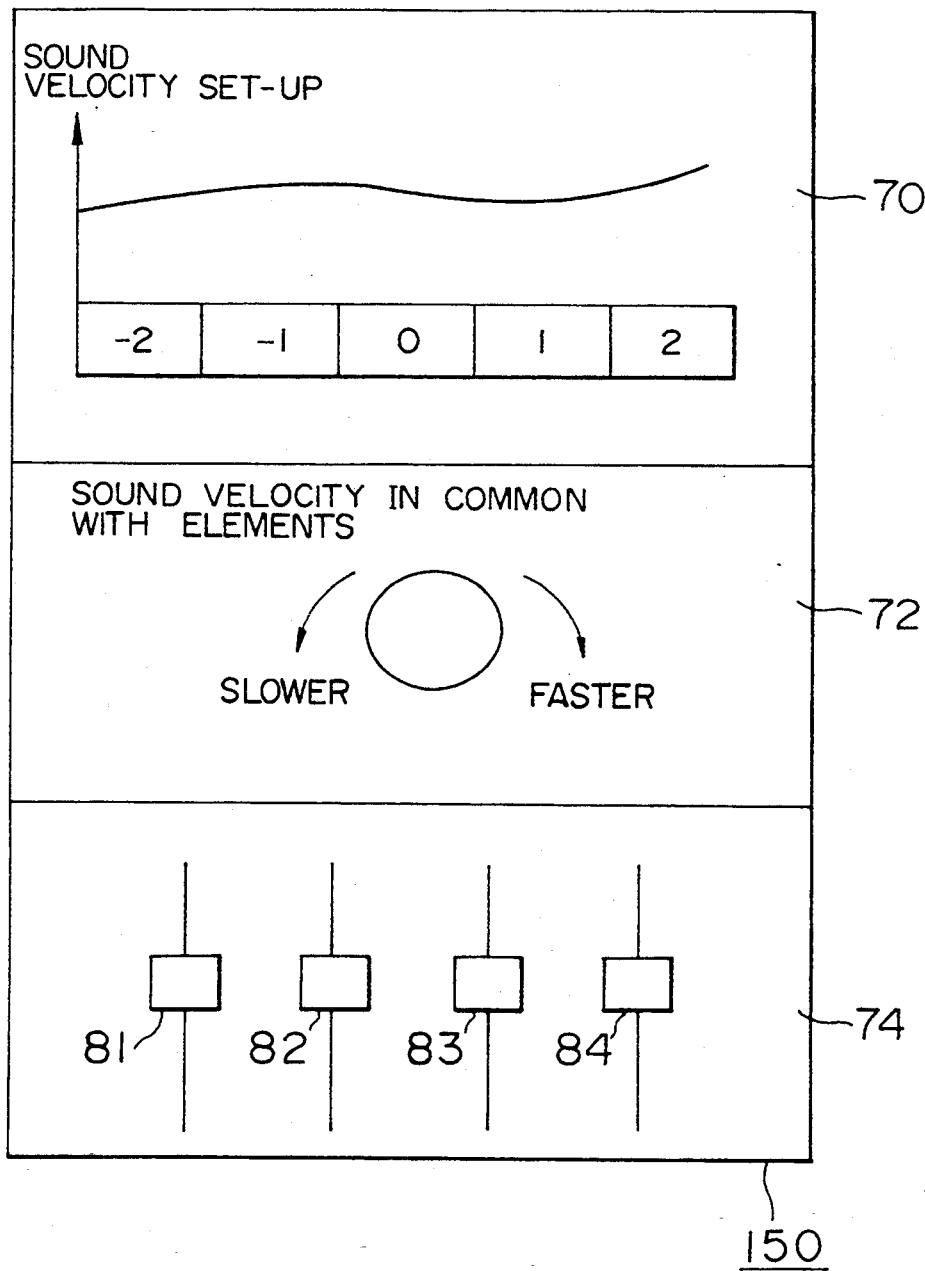
FIG. 9 is a diagram showing an example of the configuration of a control unit for sound velocity distribution.

Referring to FIG. 9, there is shown the detail of the sound velocity distribution control unit 150. Although an input unit for $A_0$ and an input unit for $A_q$ ($1 \leq q \leq 2N$) are provided separately, FIG. 9 shows the case of N=2 for simplification of explanation, that is, FIG. 9 shows the case where an input unit 72 for $A_0$ and an input unit 74 for $A_q$ ($1 \leq q \leq 2N$) are provided. When a knob in the input unit 72 for $A_0$ is turned to the direction of "faster speed", $A_0$, that is, a common sound velocity, is increased. When the knob is turned to the direction of "slower speed", $A_0$ is decreased. The delay control unit 140 gives a delay time distribution to the delay units 110 in accordance with the given sound velocity. In this occasion, it is unnecessary to use such a knob as the $A_0$ input unit and any suitable input unit may be used as long as the input unit can provide the directions of "faster speed" and "slower speed".

Figure 10:
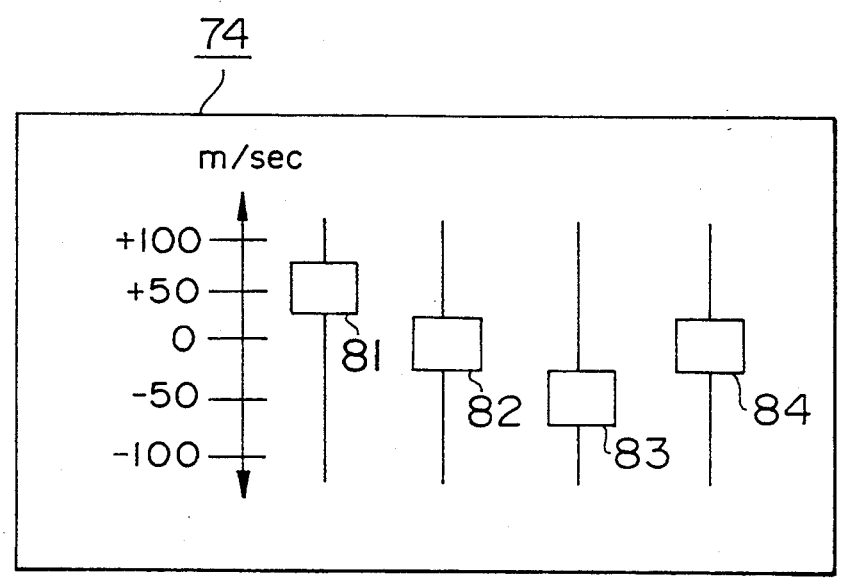
FIG. 10 is a detailed diagram showing the control unit for sound velocity distribution.

Referring to FIG. 10, there is shown the detail of the input unit 74 for $A_q$ ($1 \leq q \leq 2N$) in the sound velocity distribution control unit. In the input unit 74 for $A_q$ ($1 \leq q \leq 2N$), $A_q$ ($1 \leq q \leq 2N$) are inputted through a number 2N of slide switches. In FIG. 10, m/s is used as a unit of $A_q$; $A_1 = 50$ m/s is inputted by moving the slide switch 81 by 50 in a plus direction; and $A_3 = -50$ m/s is inputted by moving the slide switch 83 by 50 in a minus direction. The unit, input upper limit and input lower limit of $A_q$, can be set arbitrarily. In the embodiment of FIG. 9, a sound velocity distribution display unit 70 exhibiting the set-up of sound velocity distribution is provided so that sound velocities given to the respective elements (q=−2, −1, 0, 1, 2) can be recognized easily by the operator. The abscissa and ordinate of the display screen are related to sound velocity and element number respectively while the display plane is regarded as a two-dimensional orthogonal coordinate system. When the coordinate system is set on the display screen in the aforementioned manner, a line is moved up and down on the sound velocity distribution display 70 by changing $A_0$ through the input switch 72 for $A_0$ so that the line expresses the initial set-up 30 of sound velocity distribution, the optimized set-up 34 of sound velocity distribution obtained by changing a sound velocity in common with each element and the set-up 36 of sound velocity distribution obtained by changing a sound velocity in common with each other as shown in FIG. 3. When $A_q$ ($1 \leq q \leq 2N$) is then inputted through the input switch 74 for $A_q$ ($1 \leq q \leq 2N$), a function represented by $A_q f_q(p)$ is displayed after the function is added to the line determined by $A_0$. Although FIG. 9 shows the case where the set-up of sound velocity distribution and the respective numbers of the elements are displayed on the sound velocity distribution display unit 70 to make the relationship between element and sound velocity clear, any display method may be used. For example, element positions instead of element numbers may be displayed. For example, the position of the probe may be displayed without display of delimiter marks between elements. For example, a method in which display of elements is omitted may be used. In addition, the display 130 may serve also as the display unit 70 for sound velocity distribution display set-up. In the configuration of the input switch 74 for $A_q$ ($1 \leq q \leq 2N$) shown in FIG. 10, the number of elements is large, so that when, for example, the number is 128 (N=64), 128 slide switches must be arranged in parallel to make handling property poor. In this occasion, there is required an $A_q$ ($1 \leq q \leq 2N$) input method in which the operator's burden is made heavy even in the case where the number of elements is large.

Figure 11:
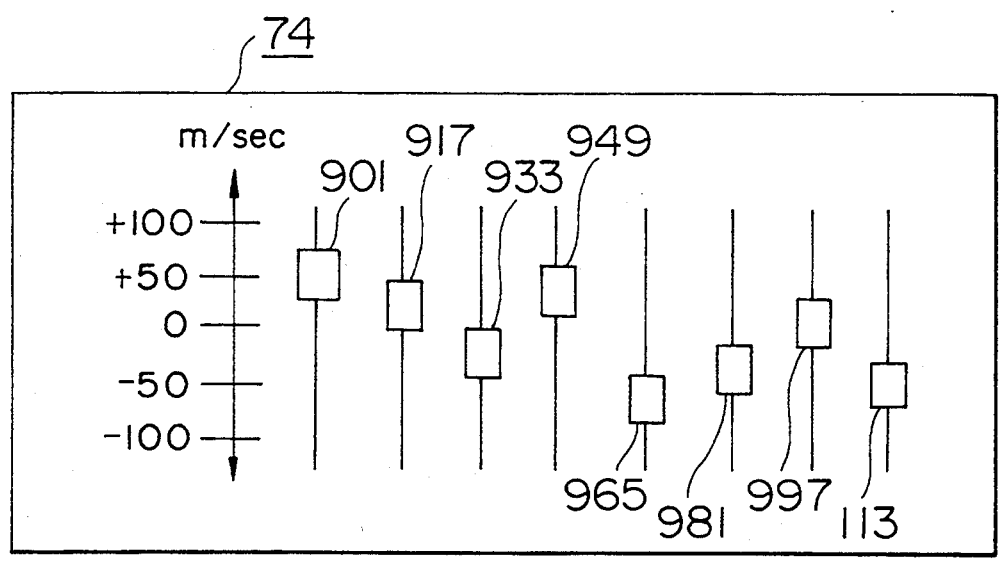
FIG. 11 is a diagram showing an example of the configuration of the control unit for sound velocity distribution in the case where a large number of elements are provided.

Referring to FIG. 11, there is shown an example of the configuration of the input switch 74 for $A_q$ ($1 \leq q \leq 2N$) in the case where the number of elements is large (N=64). In FIG. 11, coefficients $A_1$, $A_{17}$, $A_{33}$ and $A_{49}$ selected from coefficients $A_1$ to $A_{64}$ for cosine functions and coefficients $A_{65}$, $A_{81}$, $A_{97}$ and $A_{113}$ selected from coefficients $A_{65}$ to $A_{128}$ for sine functions in the expression (8) are inputted through the input switch 74 for $A_q$ ($1 \leq q \leq 2N$), that is, the aforementioned, eight coefficients ($A_1$, $A_{17}$, $A_{33}$, $A_{49}$, $A_{65}$, $A_{81}$, $A_{97}$ and $A_{113}$) are inputted through slide switches 901, 917, 933, 949, 965, 981, 997 and 113 whereas the residual coefficients are calculated by the system automatically as interpolation values obtained by interpolation on the basis of the input coefficients. For example, in the case of linear interpolation, $A_2$ is calculated as follows.

$$A_2 = (15A_1 + A_{17})/16 \tag{13}$$

The respective element numbers and the total number of elements extracted from coefficients for cosine functions and coefficients for sine functions can be set arbitrarily. As the interpolation method, any suitable method, for example, interpolation using a curve of degree two or more, such as a curve of degree two, a curve of degree three, etc., interpolation using a sinc function ((sin x)/x), and so on, may be used.

Figure 12:
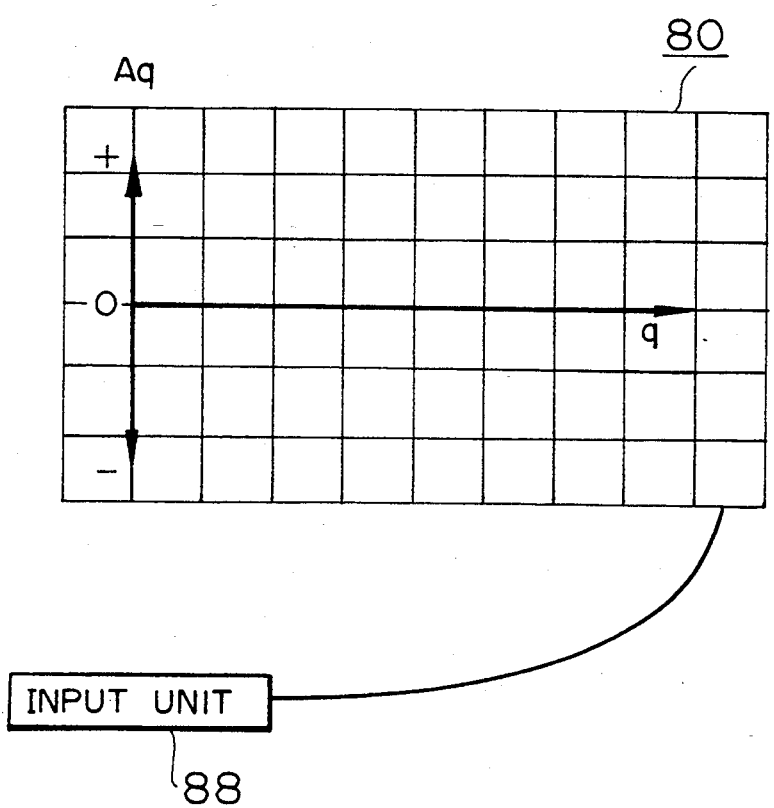
FIG. 12 is a diagram showing another example of the configuration of the control unit for sound velocity distribution in the case where a large number of elements are provided.

Referring to FIG. 12, there is shown an example of the configuration of the input switch for $A_q$ ($1 \leq q \leq 2N$) in the case where the number of elements is large. While an input unit 80 for 2-dimensional coordinates is regarded as a 2-dimensional orthogonal coordinate plane, the abscissa and ordinate are related to q and $A_q$. When a point on the 2-dimensional coordinate input unit 80 is traced by an input unit 88 for 2-dimensional coordinates, the 2-dimensional coordinates corresponding to the traced point are converted into q and $A_q$. Because $A_q$ moves in a range of from a minus value to a plus value, the center, upper and lower of the ordinate on the 2-dimensional coordinate input unit 80 are related to zero, plus and minus respectively. Because $A_1$ to $A_N$ and $A_{N+1}$ to $A_{2N}$ are coefficients for cosine functions and coefficients for sine functions respectively, an input unit for $A_1$ to $A_N$ and an input unit for $A_{N+1}$ to $A_{2N}$ may be provided separately in the input switch 74 for $A_q$ ($1 \leq q \leq 2N$). FIGS. 9, 11 and 12 show examples of the configuration of the sound velocity distribution control unit 150 in the case where the sound velocity distribution is changed on the basis of the operator's judgment of image resolution. In the case where automatic focusing is performed as described above with reference to FIG. 4, the sound velocity distribution control unit 160 does not require any $A_q$ input unit.

Although the above description has been made upon the case where $A_q$ ($0 \leq q \leq 2N$) are used as coefficients for functions forming a system of orthogonal functions when the sound velocity distribution set-up to be given to the respective elements is developed by the functions forming a system of orthogonal functions, the present invention can be applied to the case where delay times per se to be given to receiving signals of the respective elements are inputted on the basis of $A_0 f_0(p)$ of $A_q f_q(p)$ ($1 \leq q \leq 2N$) after determination of the sound velocity set-up in common with each element.

Embodiment 7

Figure 13:
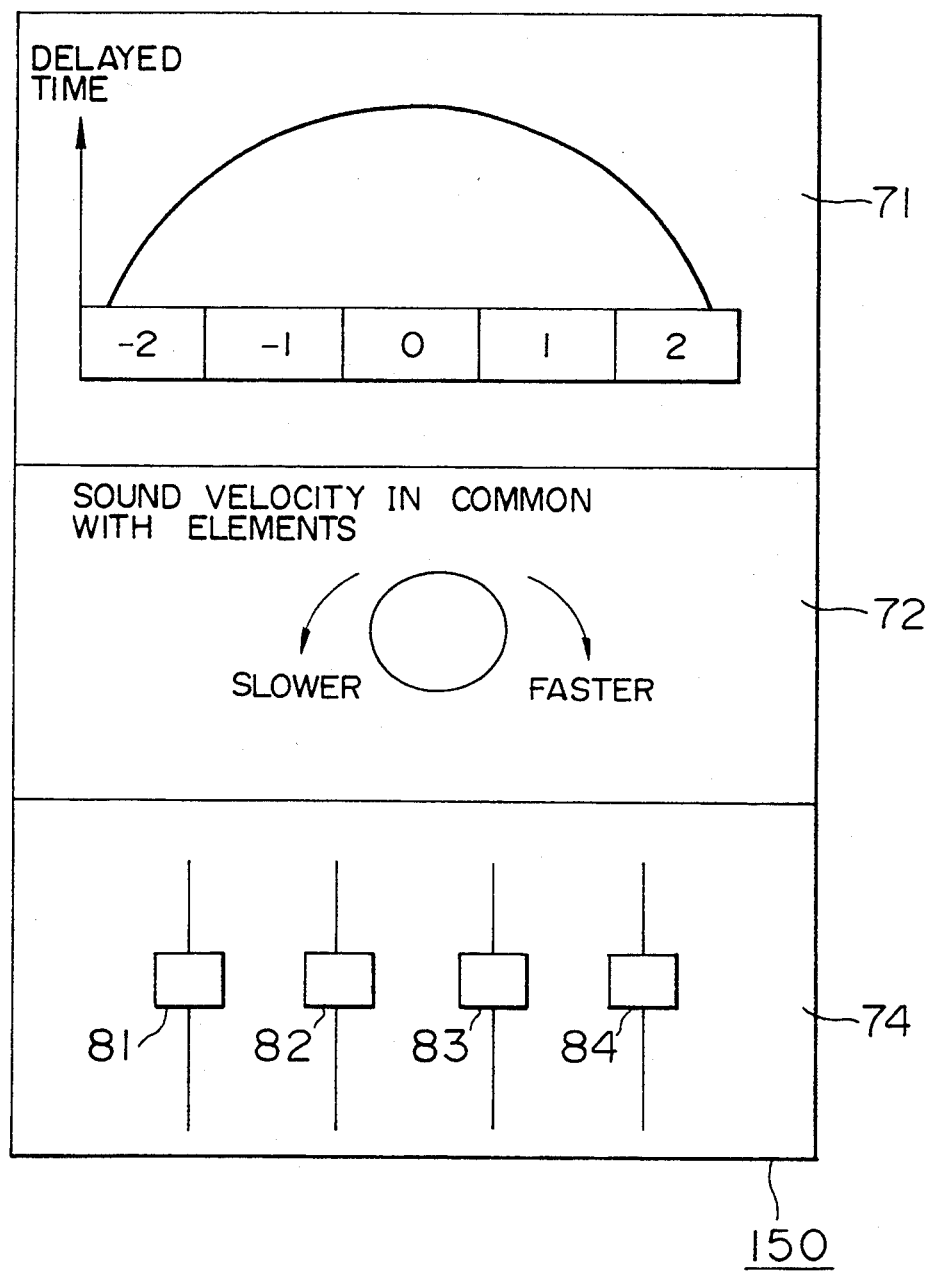
FIG. 13 is a diagram showing an example of the configuration of the control unit for sound velocity distribution in the case where both the sound velocity set-up and delayed time are changed.

Referring to FIG. 13, there is shown an example of the configuration of the sound velocity distribution control unit in the case where both sound velocity distribution set-up and delay time are changed. In FIG. 13, a display unit 71 for sound velocity distribution set-up displays delay time to be given to receiving signals of the respective elements, instead of the sound velocity distribution set up in the respective elements. In the display method used in the sound velocity distribution set-up display unit 71, while the display plane is regarded as a 2-dimensional orthogonal coordinate system, the ordinate and abscissa of the display screen are related to delay time and element number respectively. When the ordinate and abscissa are set as shown in FIG. 13, the delay time distribution for the respective elements is approximately shaped like a circular arc if all sound velocities set up in the respective elements ($q=-2, -1, 0, 1, 2$) are equal. As the equal sound velocity value decreases, the radius of the circular arc decreases. As the equal sound velocity value increases, the radius of the circular arc increases. That is, when $A_0$ is changed, the radius of the circular arc in FIG. 13 increases or decreases. Further, delay time per se is inputted on the basis of $A_q$ ($1 \leq q \leq 2N$). That is, a common sound velocity is determined in accordance with the following expression (14) by inputting $A_0$.

$$v(p) = A_0 f_0(p) \qquad (14)$$

The initial value of delay time $\tau(p)$ ($-N \leq p < N$) to be given to receiving signals of the respective elements is calculated in accordance with the thus determined sound velocity set-up and exhibited on the display unit 71 for sound velocity distribution set-up. Then, the change of the delay time $\tau(p)$ is determined in accordance with the following expression (15) by inputting $A_q$.

$$\tau(p) = \sum_{q=1}^{2N} A_q f_q(p) \qquad (15)$$

Because in this case velocity and delay time are inputted on the basis of the function $f_0$ and the function $f_q$ ($1 \leq q \leq 2N$) respectively, there is no assurance that the sound velocity set-up is converged to an optimum value.

Also in the display unit 70 for sound velocity distribution set-up in FIG. 9, delay time to be given to receiving signals of the respective elements may be displayed by relating the ordinate and abscissa of the display screen to delay time and element number respectively while regarding the display plane as a 2-dimensional orthogonal coordinate system.

Although this embodiment has shown the case where the function $v(p)$ for determining sound velocities to be set up in the respective elements is developed by a system of orthogonal functions and where coefficients for cosine functions and sine functions are inputted through the sound velocity distribution control unit 150 while regarding the expansion as Fourier expansion, the invention can be applied to the case where the term of amplitude and the term of phase are changed while regarding the expanding as complex Fourier expansion. Further, the function can be developed by using other, various systems of orthogonal functions, such as a system of Bessel functions, a system of Rademacher functions, a system of Haar functions, etc.

Although the change of sound velocities to be set up in the respective elements in the aperture for transmitting and receiving has been described above, it is a matter of course that there is no limitation with respect to the size of the aperture for transmitting and receiving and that the present invention can be applied to the case where the size of the aperture for transmitting and receiving is coincident with the size of all elements constituting the ultrasound probe.

What is claimed is:

1. An ultrasound diagnosis system comprising:
    a transducer array having a plurality of transducer elements for transmitting ultrasonic pulses into a testing object and for receiving ultrasonic pulses reflected from said testing object;
    means for giving a delay time distribution to respective transmitting and receiving signals of said elements to thereby form an ultrasonic beam a predetermined direction;
    means for displaying a sectional image of said testing object; and
    a sound velocity distribution control means for changing sound velocities to be set up in respective elements in accordance with a focal point position of said ultrasonic beam and the respective positions of said elements in order to determine said delay time distribution;
    wherein said sound velocity distribution control means changes sound velocities to be set up in the respective elements on the basis of functions forming a system of orthogonal functions in which an array number successively given to respective elements in relation to respective positions of said elements in a transmitting and receiving aperture composed of a predetermined number of said elements of said transducer array is regarded as a variable, and on the basis of expanding coefficients by which respective functions forming said system of orthogonal functions are multiplied respectively.

2. An ultrasound diagnosis system according to claim 1, wherein said system further comprises sound velocity distribution display means for displaying sound velocities to be set up in the respective elements in said transmitting and receiving aperture, said sound velocity distribution display means including a first coordinate axis for displaying sound velocities to be set up in the respective elements, and a second coordinate axis for displaying said array number.

3. An ultrasound diagnosis system according to claim 1, wherein said sound velocity distribution control means includes means for changing a sound velocity set up as a value in common with the respective elements in said transmitting and receiving aperture, and means for changing sound velocities set up as different values in at least a part of the elements in said transmitting and receiving aperture.

4. An ultrasound diagnosis system according to claim 1, wherein said means for giving a delay time distribution includes means for setting the delay time distribution, which is determined on the basis of the sound velocity distribution by said sound velocity distribution control means, as an initiating time distribution of transmitting pulses for driving the respective elements in said transmitting and receiving aperture.

5. An ultrasound diagnosis system according to claim 1, wherein the functions forming the system of orthogonal functions are trigonometric functions.

6. An ultrasound diagnosis system according to claim 1, wherein said system further comprises:
analog-to-digital conversion means for analog-to-digital converting the respective receiving signals of the elements in said transmitting and receiving aperture; and
storage means for storing output signals of said analog-to-digital conversion means so that the sectional image is obtained by delaying and adding data stored in said storage means.

7. An ultrasound diagnosis system according to claim 1, wherein said system further comprises:
analog-to-digital conversion means for analog-to-digital converting the respective receiving signals of the elements in said transmitting and receiving aperture; and
storage means for storing output signals of said analog-to-digital conversion means so that a first sectional image is obtained in real time by delaying and adding the respective receiving signals of the elements in said transmitting and receiving aperture and, at the same time, the output signals of said analog-to-digital conversion means are stored in said storage means so that the change of the sound velocity distribution set up in the respective elements is performed when a second sectional image is obtained by delaying and adding data stored in said storage means.

8. An ultrasound diagnosis system according to claim 1, wherein said system further comprises a resolution evaluator for evaluating a resolution of said sectional image on the basis of outputs from a beam former which delays and adds the respective receiving signals of the elements, so that expanding coefficients are determined to make an output of said resolution evaluator approach a predetermined value.

9. An ultrasound diagnosis system according to claim 8, wherein said resolution evaluator calculates a sum of respective squares of the outputs from the beam former.

10. An ultrasound diagnosis system according to claim 8, wherein said resolution evaluator calculates a sum of respective squares of the outputs from the beam former in a predetermined region of said sectional image.

11. An ultrasound diagnosis system according to claim 1, wherein said sound velocity distribution control means calculates a sound velocity distribution to be set up for the respective elements in said transmitting and receiving aperture, and sets up sound velocities of respective elements in a transmitting and receiving aperture adjacent to said transmitting and receiving aperture by referring to said sound velocity distribution.

12. An ultrasound diagnosis system comprising:
a transducer array having a plurality of transducer elements for transmitting ultrasonic pulses into a testing object and for receiving ultrasonic pulses reflected from said testing object;
means for giving a delay time distribution to respective transmitting and receiving signals of said elements to thereby form an ultrasonic beam focusing to a predetermined direction;
means for displaying a sectional image of said testing object;
a sound velocity distribution control means for changing sound velocities to be set up in respective elements in accordance with a focal point position of said ultrasonic beam and the respective positions of said elements in order to determine said delay time distribution, wherein said sound velocity distribution control means changes sound velocities to be set up in the respective elements on the basis of functions forming a system of orthogonal functions in which an array number successively given to respective elements in relation to respective position of said elements in a transmitting and receiving aperture composed of a predetermined number of said elements of said transducer array is regarded as a variable, and on the basis of expanding coefficients by which respective functions forming said system of orthogonal functions are multiplied respectively; and
sound velocity distribution display means for displaying sound velocities to be set up in the respective elements in said transmitting and receiving aperture, wherein said sound velocity distribution control means includes means for changing a sound velocity set up as a value in common with the respective elements in said transmitting and receiving aperture, and means for changing sound velocities set up as different values in at least a part of the elements in said transmitting and receiving aperture, and wherein said sound velocity distribution display means further includes a first coordinate axis for displaying sound velocities to be set up in the respective elements, and a second coordinate axis for displaying said array number.

13. An ultrasound diagnosis system according to claim 12, wherein said functions forming the system of orthogonal functions are trigonometric functions.

14. An ultrasound diagnosis system according to claim 12, wherein said system further comprises:
analog-to-digital conversion means for analog-to-digital converting the respective receiving signals of the elements in said transmitting and receiving aperture; and
storage means for storing output signals of said analog-to-digital conversion means so that the sectional image is obtained by delaying and adding data stored in said storage means.

15. An ultrasound diagnosis system according to claim 12, wherein said system further comprises:
analog-to-digital conversion means for analog-to-digital converting the respective receiving signals of the elements in said transmitting and receiving aperture; and
storage means for storing output signals of said analog-to-digital conversion means so that a sectional image is obtained in real time by delaying and adding the respective receiving signals of the elements in said transmitting and receiving aperture and, at the same time, the output signals of said analog-to-digital conversion means are stored in said storage means so that the change of the sound velocity distribution set up in the respective elements is performed when a second sectional image is obtained by delaying and adding data stored in said storage means.

16. An ultrasound diagnosis system according to claim 12, wherein said system further comprises a resolution evaluator for evaluating a resolution of said sectional image on the basis of outputs from a beam former which delays and adds the respective receiving signals of the elements, so that expanding coefficients are determined to make an output of resolution evaluator approach a predetermined value.

17. An ultrasound diagnosis system according to claim 16, wherein said resolution evaluator calculates a sum of respective squares of the outputs from the beam former.

18. An ultrasound diagnosis system according to claim 16, wherein said resolution evaluator calculates a sum of respective squares of the outputs from the beam former in a predetermined region of said sectional image.

19. An ultrasound diagnosis system according to claim 12, wherein said sound velocity distribution control means calculates a sound velocity distribution to be set up for the respective elements in said transmitting and receiving aperture, and sets up sound velocities of respective elements in a transmitting and receiving aperture adjacent to said transmitting and receiving aperture by referring to said sound velocity distribution.

* * * * *